United States Patent [19]

Le Gall et al.

[11] Patent Number: 4,897,799

[45] Date of Patent: Jan. 30, 1990

[54] FORMAT INDEPENDENT VISUAL COMMUNICATIONS

[75] Inventors: Didier J. Le Gall, Springfield; John D. Robbins, Mountain Lakes, both of N.J.

[73] Assignee: Bell Communications Research, Inc., Livingston, N.J.

[21] Appl. No.: 96,738

[22] Filed: Sep. 15, 1987

[51] Int. Cl.$^4$ .............. G06F 15/62; H04N 1/00; H04N 1/32

[52] U.S. Cl. .................. 364/514; 364/518; 358/11; 358/12; 358/400

[58] Field of Search ........... 364/514, 518, 521, 522, 364/200, 900; 358/257, 11, 12, 256; 340/720, 721, 812

[56] References Cited

U.S. PATENT DOCUMENTS

| | | | |
|---|---|---|---|
| 4,058,672 | 11/1977 | Crager et al. | 358/257 |
| 4,330,847 | 5/1982 | Kuseski | 364/900 |
| 4,384,307 | 5/1983 | Kuzmik et al. | 364/514 |
| 4,491,873 | 1/1985 | Takayama | 364/514 |
| 4,763,279 | 8/1988 | Kellam et al. | 364/520 |
| 4,763,283 | 8/1988 | Coutrot | 364/521 |

OTHER PUBLICATIONS

J. F. Jarvis et al, "A Survey of Techniques for the Display of Continuous Tone Pictures on Bilevel Displays, Computer Graphics and Image Processing", 5, 13–40 (1976).

T. Chen et al, "Image Decimation and Interpolation Techniques Based on Frequency Domain Analysis, " IEEE Trans. on Comm., vol. COM-32, No. 4, Apr. 1984, pp. 479-483.

H. S. Hou and H. C. Andrews, "Cubic Splines for Image Interpolation and Digital Filtering," IEEE Transactions on Acoustics, Speech and Signal Processing, vol. ASSP-26, pp. 508–517, Dec. 1978.

"Color Image Quantization for Frame Buffer Display", Computer Graphics, Paul Heckbert, Jul. 1982, vol. 16, No. 3, pp. 297–307.

"Advances in FAX", Proceedings of the IEEE, Yasuhiko Yasuda et al, Apr. 1985, vol. 73, No. 4, pp. 706–730.

Primary Examiner—Parshotam S. Lall
Assistant Examiner—V. N. Trans
Attorney, Agent, or Firm—James W. Falk

[57] ABSTRACT

A method for enabling format independent communication of visual information between diverse computers, work stations, and terminals is disclosed. The inventive method relies on a universal format which can be used to represent the data comprising any raster display. Illustratively, the data comprising a raster display is first translated from the native format of an originating system into the universal format. When in the universal format, it is possible to convert the raster from one type to another (e.g., from color to pseudo-color or grey to pseudo-color) so that the raster can be displayed by a receiving system which comprises equipment different from that of the originating system.

3 Claims, 5 Drawing Sheets

FIG. 3A

| GRAY / GRAY | GRAY / PSEUDO | GRAY / FULL COLOR |
|---|---|---|
| PSEUDO / GRAY | PSEUDO / PSEUDO | PSEUDO / FULL COLOR |
| FULL COLOR / GRAY | FULL COLOR / PSEUDO | FULL COLOR / FULL COLOR |

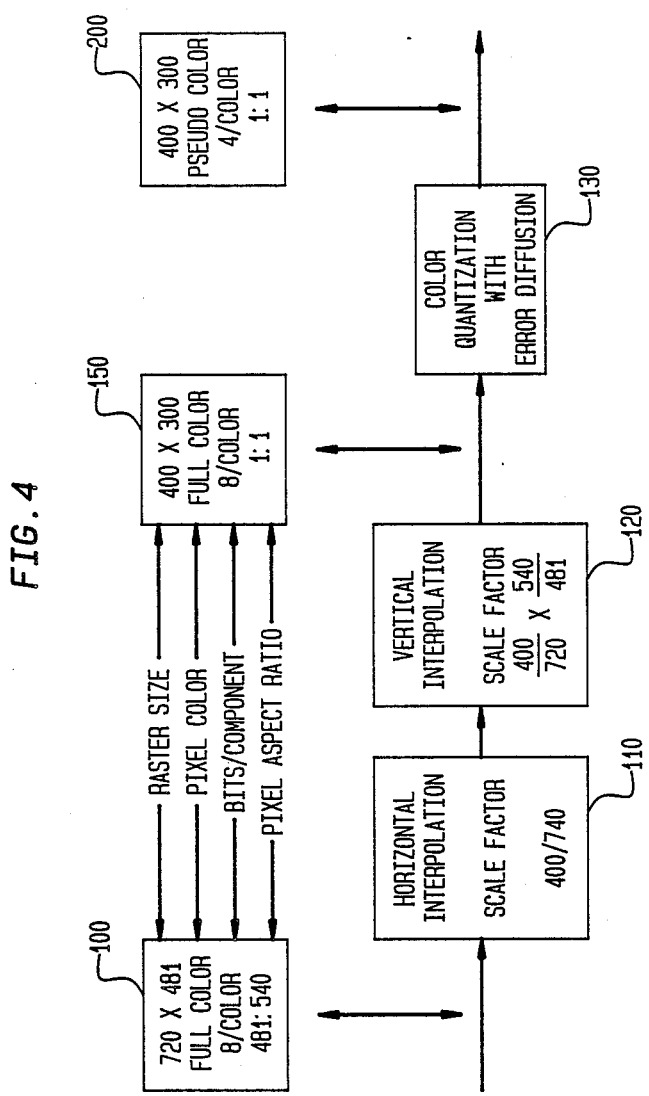

FORMAT INDEPENDENT VISUAL COMMUNICATIONS

FIELD OF THE INVENTION

The present invention relates to the transmission of visual information and in particular to the transmission of visual information in a manner to overcome the diversity of formats used within the electronic environment of diverse computers, terminals and workstations.

BACKGROUND OF THE INVENTION

While the cost and performance of visual information systems are constantly improving, digital communication of visual information will have to overcome the diversity of formats used within the electronic environment of computers, display terminals, and workstations. This diversity leads to mismatches of visual data formats between different systems and devices making useful exchange of information difficult.

Integration of text, graphics and digital images in personal computers, workstations and main-frames is presently driven by the requirements of specific applications (e.g., electronic publishing, presentation graphics, computer aided circuit design). Typically, communication of graphics and pictures is minimized for lack of standards, and applications are introduced primarily as stand alone systems. For example, many systems with editors can create text and graphics page descriptions which can then be printed on a system hard copy device. The data format used for such descriptions is "native" to the system in question. Unfortunately, if the document file is transferred to a different type of system, it will likely be unintelligible (i.e., in a foreign format), even for printing, and, if usable, its presentation on a display or printer may be substantially different.

The existence of many formats is a practical necessity, since a single comprehensive format would often impose unnecessary overhead within an application. In practice, different manufactures use different native formats even for similar applications. Furthermore, new formats are continuously evolving and technological advances can reduce an accepted standard to obsolescence. As a result, it appears unlikely that ubiquitous visual communication will be grounded on the concensus use of a small group of standard formats.

Format independence, in the broadest sense, is the ability to communicate among computers, terminals and workstations when no party has knowledge of another party's format requirements. Here, the concern is with the format independent communication of visual information whose destination is a display device.

One way to achieve format independence is through pairwise conversion. In the pairwise conversion model, a conversion facility matches the format of incoming data to the format requirement of the output. Such a pairwise conversion is used in the Japanese facsimile network when dealing with conversion between group III and group IV facsimile. (See Y. Yasude et al, "Advances in Fax" PROC IEEE Vol. 73, No. 4, April 1985). The pairwise conversion approach is feasible when the number of formats is small; however, for N formats the complexity increases as $N^2$ and the system becomes rapidly intractable.

The other approach to format independence involves use of a "universal format" to which any native format can be converted.

It is an object of the present invention to provide a system which enables format independent communication of visual data between a variety of devices. More particularly, it is an object of the invention to provide a universal format which enables format independent communication of visual data. It is a further object of the invention to provide a universal format which enables the transmission of raster display data between otherwise incompatible display devices.

SUMMARY OF THE INVENTION

The present invention is a method for enabling format independent communications of visual information between and among diverse systems such as computers, work stations, and terminals. In particular, the inventive method enables the transmission of visual information, such as the data comprising a raster display, from an originating system which uses a first native format to a receiving system which utilizes a second format native to it.

The inventive method relies on a universal format which can be used to represent the data comprising any raster display. In particular, in accordance with the present invention any raster display can be characterized by:

1. the pixel aspect ratio which defines the shape of the individual pixels comprising the raster display;
 2. the solution, i.e., the number of pixels in the horizontal and vertical directions in the raster;
 3. the color mode, i.e., grey, pseudo-color or full color (red, green, blue);
 4. the number of bits per pixel.

All of this information is contained at least implicitly in every native raster format. To convert to the universal format it is necessary to make this information explicit. This can be done by putting a header in front of the data comprising the raster display, which header includes fields containing information as to the pixel aspect ratio, resolution, color mode, and number of bits per pixel. Such a header may be provided by a simple formatting program located at the originating system. The data comprising the raster display (after translation to the universal format) is transmitted to a conversion unit which processes the data comprising the raster display so that it can be utilized by the receiving system.

To accomplish this processing, the receiving system also transmits a header to the conversion unit which header has fields containing information as to the pixel aspect ratio, resolution, color mode, and number of bits per pixel of raster displays which can be displayed using the receiving system.

Upon receipt of the headers from the originating system and receiving system, the conversion unit is able to compare the originating and receiving raster formats. Algorithms are chosen to convert the data comprising the raster from the originating format to the format usable by the receiving system. Such conversion will often effect all four characteristics of the raster type definition and includes for example spatial scaling as well as conversion from one color mode to another.

The raster data, once converted, is transmitted to the receiving system.

The above described method enables ubiquitous visual communications for telecommunications network, computers and display terminals. A universal raster display format is utilized which makes the diversity of data formats transparent to applications, systems and users.

BRIEF DESCRIPTION OF THE DRAWING

FIGS. 3A–3I schematically illustrate algorithms for use in connection with the inventive method; and FIG. 4 schematically illustrates the conversion of one particular type of raster display to another particular type of raster display in accordance with the inventive method.

DETAILED DESCRIPTION

Figure 1:
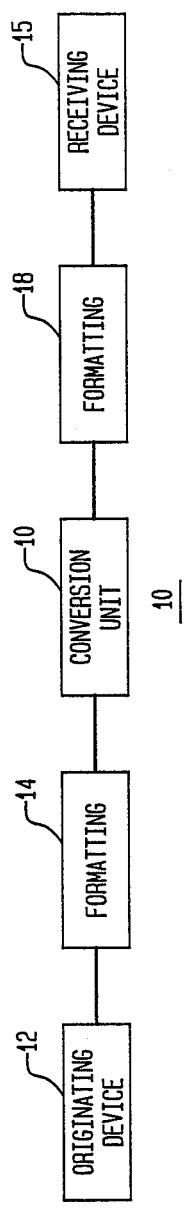
FIG. 1 schematically illustrates a method for transmitting visual data between two diverse systems in accordance with an illustrative embodiment of the invention.

Turning to FIG. 1, a system 10 for enabling format independent communication of visual information is illustrated. Typically, the originating device 12 wishes to send a raster display to a receiving device 14. The data comprising the raster display in the originating device has the native format of the originating device. In order for this raster to be displayed at the receiving device, the data comprising the raster must be converted to the native format of the receiver device.

In accordance with the present invention, communication of visual information between two otherwise incompatible devices is accomplished using a universal representation, or more particularly, a universal raster format.

The inventive method relies on a universal format which can be used to represent the data comprising any raster display. In particular as indicated above, any raster display can be characterized by:

1. pixel aspect ratio which defines the shape of the individual pixels comprising the raster display;
2. the resolution, i.e. the number of pixels in the horizontal and vertical directions;
3. the color mode, i.e., gray, pseudo-color, or full color; and
4. the number of bits per pixel.

A formatting program designated by box 14 of FIG. 1 provides conversion between the native format and the universal raster format. This formatting step does not add much overhead to the conversion process and can be accomplished by conventional techniques. In fact, this formatting step usually means no more than making explicit information which is usually contained implicitly in the raster display. Thus, the formatting operation usually involves generation of a header of the type 20 shown in FIG. 2. The header 20 includes fields for each of the raster characteristics identified above, i.e., raster size, color mode, bits/pixel, and pixel aspect ratio. In some cases, translation may also involve rearranging the order of the bits comprising the raster image data to be transmitted.

Figure 2:
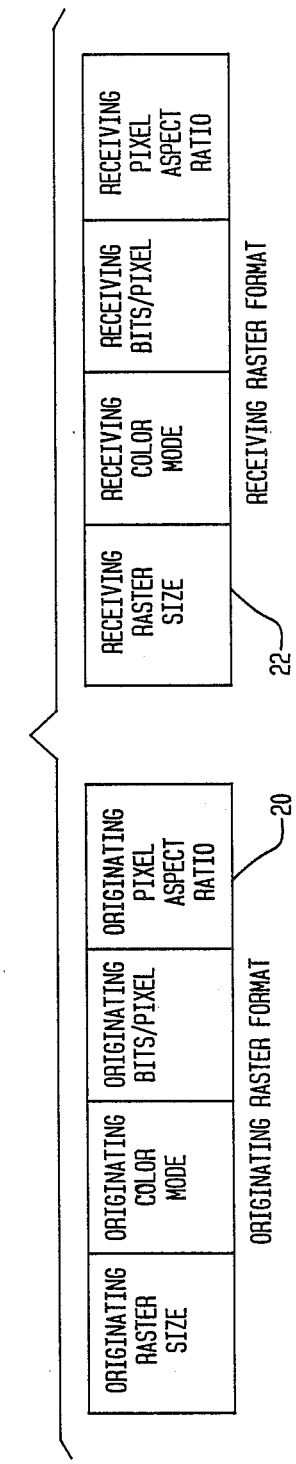
FIG. 2 schematically illustrates a universal raster format for use in connection with the inventive method.

Thus, as a result of the formatting process a header 20 of the form shown in FIG. 2 is transmitted to a conversion unit 16. The conversion unit may be implemented in hardware or software, although hardware may achieve greater speed. The conversion unit may be located at the originating device, at the receiving device, or in a central location separate from both the receiving and originating devices. The conversion unit also receives a header 22 from the receiving device 15 and its associated formatter 18. The header 22 explicitly states the characteristics of raster displays in the native format of the receiving device including pixel aspect ratio, color mode, raster size, and bits per pixel.

Upon receipt of the headers 20, 22, the conversion unit becomes aware of an originating raster format and a target raster format which can be used by the receiving device. The conversion unit 16 then processes the data comprising the originating raster so that it acquires the characteristic of the target raster format.

After conversion by the conversion tools, the data comprising the raster is in the target format, i.e. it has the characteristics indicated in the header 22 of FIG. 2, i.e. the data is in the universal format but it has the characteristics needed for display on the receiving device 15. The formatter 18 may be used to rearrange the data and remove a header of the type 22 so that the data assumes the format native to the receiving device.

The originating device may be arranged to send an address of the receiving device to the conversion unit. This address may be independent of the header information. The conversion unit may also be arranged to access the receiving device in response to this address to cause the receiving device to transmit to the conversion unit its raster format information or that information may have been pre-stored in the conversion unit.

The operation of the conversion unit 16 of FIG. 1 will now be discussed in greater detail. Conversion from one raster type to another will often effect all four raster characteristics. Thus conversion will involve conversions of the color mode as well as changes in raster size, pixel aspect ratio, and bits/pixel.

Conversion from one raster size and pixel aspect ratio to another may be carried out using conventional algorithms such has those described in T. C. Chen et al, "Image Decimation and Interpolation Techniques Based on Frequency Domain Analysis", IEEE Transactions on Communications Vol. COM-32 No. 4, April 1984, pp. 479–483, and in H. S. Hou and H. C. Andrews, "Cubic Splines for Image Interpolation and Digital Filtering", IEEE Transactions on Acoustics, Speech and Signal Processing, Vol ASSP-26, pp. 508–517, December 1978. Conversions involving a change in the number of bits per pixel may be carried out using conventional algorithms such as those disclosed in J. F. Jarvis et al, "A Survey of Techniques for the Display of Continuous Tone Pictures on Bilevel Displays", Computer Graphics and Image Processing 5, 13–40 (1976).

Figure 3B:
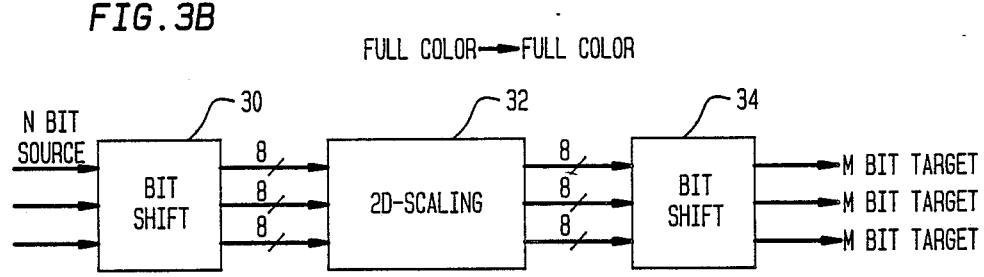

Typically, there are three major color modes which must be accounted for: grey, pseudo-color and full color. Thus, there are nine possible types of conversion illustrated by the matrix of FIG. 3A.

The algorithms represented by the individual matrix elements of FIG. 3A are chosen so that all scaling operations are performed on 8 bit gray and 24 bit full color (i.e., 8 red, 8 green, 8 blue) representations. The scaling operations involve the use of known image interpolation algorithms. The individual matrix elements are discussed below.

1. ; Full Color→Full Color (FIG. 3B) Since both source and target are full color, only scaling operations are necessary. Thus, an N bit per color component is converted to an 8 bit representation (i.e., 8 R, 8 G, 8 B) by means of bit shifter 30. The 8 bit representation is then scaled using conventional scaling algorithms (box 32) and bit shifter 34 provides an M bit/component output for the target device.

Figure 3C:
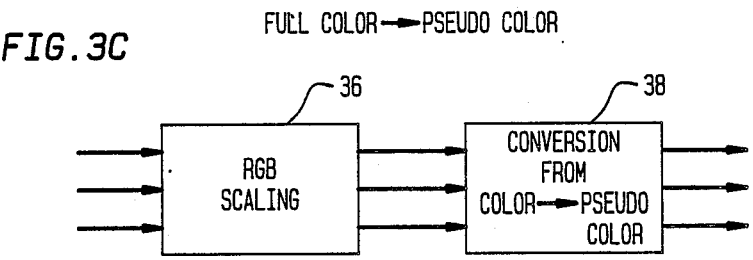

2. Full Color→Pseudo-Color (FIG. 3C) Scaling is done in the full color representation (box 36) and then an algorithm is used to convert from full color to pseudo-color (box 38). Such an algorithm is disclosed in Heckbert "Color Image Quantization For Frame Buffer Display", ACM 0-89791-076-1182/007/0297.

Figure 3D:
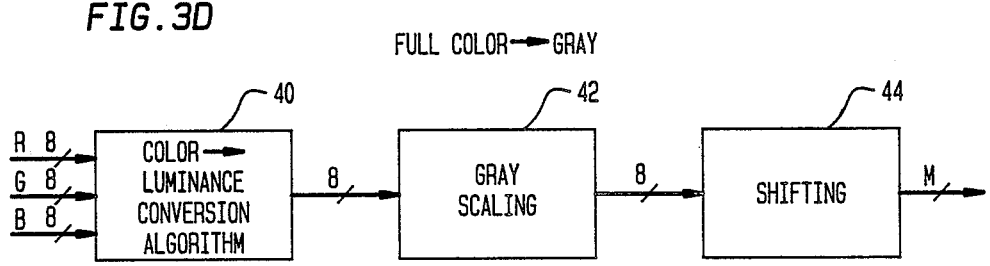

3. Full Color→Gray (FIG. 3D) Conversion of a full color RGB representation to luminance (box 40) is illustratively performed according to the formula $$Y = 0.59G + 0.3R + 0.11B \text{ (box 40)}$$

to produce an 8 bit gray representation. Scaling is performed using in the 8 bit gray representation (box 42) and bit shifting (box 44) is used to convert 8-bit gray to an M bit gray representation for use by the receiving device.

Figure 3E:
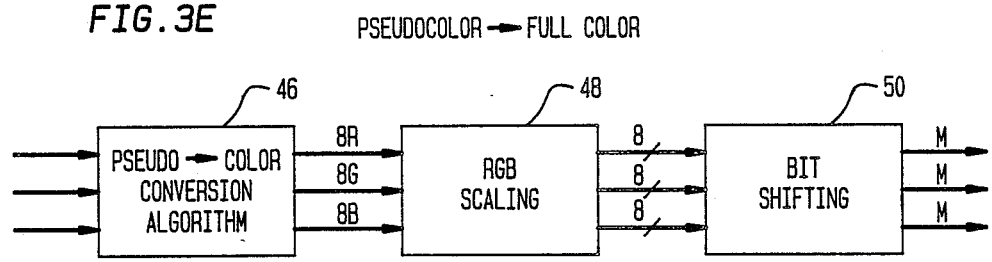

4. Pseudo-Color→Full Color (FIG. 3E) A conventional algorithm is used to convert from pseudo-color to a 24 bit (8R, 8G, 8B) full color representation (box 46). Scaling is performed in the 24 bit full color representation (box 48) and bit shifting (box 50) is provided if the target representation requires M, M≠8 bits per color component.

Figure 3F:
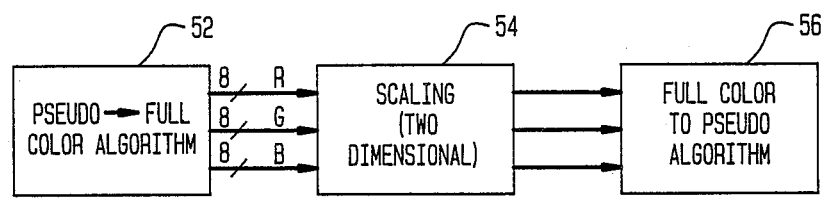

5. Pseudo-Color→Pseudo-Color (FIG. 3F) Since both source and target are pseudo-color, only scaling is necessary. However, such scaling is only accomplished in a full color representation. Thus, the source pseudo-color raster is converted to full color (box 52, scaling is done in the full color representation (box 54) and then there is conversion back to pseudo-color (box 56).

Figure 3G:
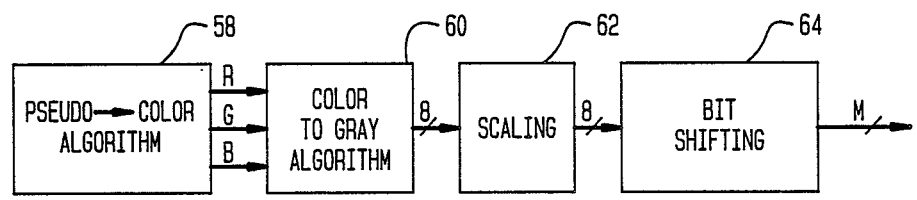

6. Pseudo-Color→Gray (FIG. 3G) The pseudo-color representation is first converted to full color (Box 58). The full color representation is then converted to an 8-bit gray representation (box 60) using the algorithm discussed above. Scaling is performed in the 8-bit grey representation (box 62). Bit shifting is done (box 64) to convert from an 8-bit gray representation to an M bit, M≠8 target representation.

Figure 3H:
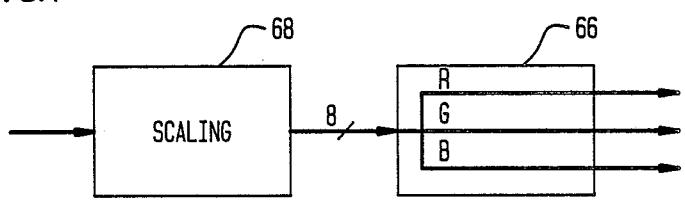

7. Gray→Full Color (FIG. 3H) Grays are defined as colors with varying luminance but having equal amounts of red, green and blue. Thus to convert from gray to full color, a single pixel value is duplicated for each of three color channels (RGB) (Box 66). economically performed in the gray representation, scaling is performed before color conversion (box 68).

Figure 3I:
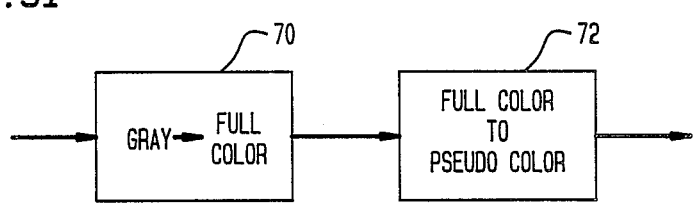

8. Gray to Pseudo-Color (FIG. 3I) This type of conversion is first achieved by converting from gray to full color (box 70) in the manner discussed above and then converting from full color to pseudo-color (box 72).

9. Gray→Gray Conventional algorithms are used to convert between various types of gray representations such as binary and multi-level gray scales. The following examples illustrate the inventive method.

Example 1 Sun Work Station transmits visual information to a McIntosh using McPaint Software The Sun computer native file format contains explicit information on the raster size, and color mode (either bilevel gray, 8 bit pseudo-color, or 8 bit gray). The Sun native format is first translated into the universal format. To do this the pixel aspect ratio which is 1:1 is made explicit in the header which is transmitted to the conversion unit. The other three raster characteristics are already explicit so no other transformation of the data from the Sun computer is required. It is only necessary to provide an explicit value for the aspect ratio in the header. The header and the data from the Sun computer are then sent to the conversion unit.

The target raster (i.e., McPaint Format) has the following characteristics, 1 bit/pixel, gray color, 1:1 aspect ratio, and 550×720 raster size. Using the algorithms discussed above in connection with FIG. 3 the data with the raster characteristics received from the Sun computer is converted to a raster in universal format with characteristics of the McIntosh machine.

It is now necessary to translate from the universal format to the native format of the McIntosh. In the McIntosh native format, the raster size, color mode, bits/pixel and pixel aspect ratio are all implicit. In the McIntosh native format you need to explicitedly provide a name for the picture and the number of bits it takes to represent the picture. A formatting process provides this information and reorders the bits resulting, in a bonafide McIntosh file (i.e., McFile).

Example 2

FIG. 4 shows how the algorithms of FIG. 3 may be used to convert from one raster representation to another. Illustratively a raster with characteristics 100 is to be converted to another raster with raster characteristics 200. This involves conversion from a full color raster to a pseudo-color raster. Thus the algorithms of FIG. 3 may be used.

Accordingly, horizontal and vertical scaling (as indicated by blocks 110 and 120) is performed in the full color RGB representation to obtain the intermediate raster with characteristic 150. After this, a conventional algorithm is utilized to convert from full color to pseudo-color, as indicated by block 130.

Finally, the above described embodiment of the invention are intended to be illustrative only. Numerous alternative embodiments may be devised by those skilled in the art without departing from the spirit and scope of the following claims. In particular, the inventive method is also applicable to coded raster formats. Thus, if the native format of the originating device is a coded raster format, the conversion unit first decodes the coded raster format and conversion proceeds in accordance with the process discussed above. Similarly, once conversion takes place the raster may be coded in the conversion unit to provide a coded raster format for the receiving device.

What is claimed is:

1. A method for enabling the transmission of raster image data having a first raster format from a first display system to a second display system which uses a second raster format, said method comprising the steps of providing a universal conversion unit including a group of algorithms for converting data from one raster format out of a multiplicity of possible raster formats to another raster format out of said multiplicity of possible raster formats, comparing at said universal conversion unit information explicitly identifying a plurality of predetermined characteristics of said first raster format with information explicitly identifying a plurality of predetermined characteristics of said second raster format, said first and second raster formats belonging to said multiplicity of raster formats, based on said comparison, selecting a subset of algorithms from said group of algorithms, said selected subset of algorithms comprising the subset of algorithms from said group of algorithms necessary to convert said raster image data in said first raster format to said second raster format, processing said raster image data in said first raster format with said selected subset of algorithms so that said raster image data in said first raster format is converted to said second raster format, and receiving said raster image data in said second raster format at said second display system.

2. The method of claim 1 wherein said predetermined characteristics of said first and second raster formats include pixel aspect ratio, color mode, raster size and number of bits per pixel.

3. A method for transmitting image data in a first raster format characterized by a first pixel aspect ratio, a first color mode, a first raster size and a first number of bits per pixel from a first display system to a second display system capable of displaying image data in a second raster format characterized by a second pixel aspect ratio, a second color mode, a second raster size and a second number of bits per pixel, said method comprising the steps, providing a raster format conversion unit including a group of algorithms capable of selectively converting the pixel aspect ratio, color mode, raster size and numbers of bits per pixel of data in a raster format, transmitting from said first display system to said conversion unit data explicitly identifying said first aspect ratio, first color mode, first raster size, and first number of bits per pixel of said first raster format, transmitting from said second display system to said conversion unit data explicitly identifying said second aspect ratio, second color mode, second raster size and second number of bits per pixels of said second raster format, comparing at said conversion unit said first and second aspect ratios, color modes, raster sizes and numbers of bits per pixel, based on said comparing step, selecting one or more algorithms from said group of algorithms for converting said image data in said first raster format and having said first aspect ratio, first color mode, first raster size and first number of bits per pixel into image data in said second raster format and having said second aspect ratio, second color mode, second raster size and second number of bits per pixel, and processing said image data in said first raster format using said one or more selected algorithms so that said image data is converted into said second raster format for display at said second display system.

* * * * *